March 28, 1950  W. C. CARLTON  2,501,886
DEVICE FOR PROTECTING THE TIRES OF VEHICLES
Filed Dec. 18, 1946
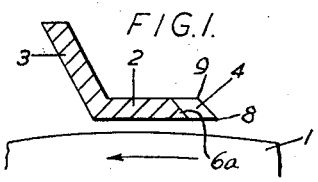
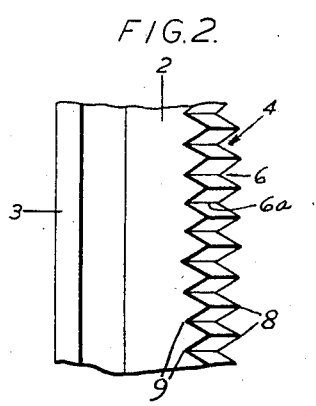
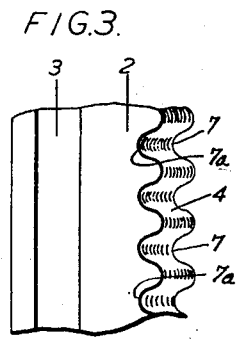
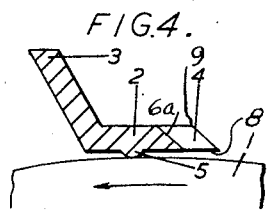
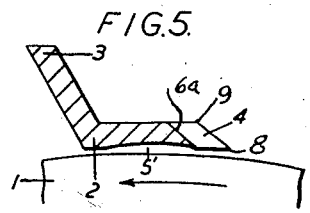
Inventor
WILLIAM C. CARLTON
By
Young, Emery & Thompson
Attorneys Patented Mar. 28, 1950

2,501,886

UNITED STATES PATENT OFFICE 2,501,886

DEVICE FOR PROTECTING THE TIRES OF VEHICLES

William Charles Carlton, Ilford, England

Application December 18, 1946, Serial No. 717,018
In Great Britain January 8, 1945

Section 1, Public Law 690, August 8, 1946
Patent expires January 8, 1965

4 Claims. (Cl. 280—158)

This invention relates to means or devices for protecting the tires of power driven vehicles and other wheeled vehicles including aircraft, and more particularly road vehicles such as automobiles, motor trucks, motor buses and the like.

It has previously been proposed to provide devices which are adapted to protect and prolong the useful life of the tires to the extent of providing a means for eliminating, removing or extracting therefrom, as and when they are collected or picked up, foreign bodies or objects such as nails, screws, or flints, and to this end to provide means comprising a guard, clearing bar, deflector, extractor or the like mounted so as to be maintained in contact with or spaced from the tire surface in order to remove foreign bodies from the latter as it rotates; the said guard or the like being arranged, if so desired to move towards or away from the center of rotation of the tire and preferably adapted to rock laterally so as to follow possible inequalities or deformation in the tire.

It has also been proposed to provide such guard, clearing bar or like member, at its end adjacent the tire surface to be protected, with an outwardly projecting blade-like portion which lies substantially parallel with or tangential to the tread surface and which is formed with a bevelled edge provided with teeth or indentations between or into which the foreign bodies may enter thus to facilitate the extraction or deflection of the said bodies from the tire surface.

I have found in practice that the indented edge of the blade forming the guard or like member is less likely to clog with dirt and will more effectively engage and deflect the foreign bodies or objects if the entire leading or operative indented edge of the blade is sharp edged and the marginal part thereof made thin and this condition can, of course, be obtained by using a blade of thin plate material or one having the leading marginal edge portion thereof reduced in thickness. On the other hand, if the blade or serrated or indented marginal portion thereof is made sufficiently thin for the stated purpose, the blade is liable to be easily fractured or to be distorted by the foreign bodies engaged thereby.

The primary object of the present invention is to provide a modified and improved blade for the purpose set forth by means of which the advantage of a thin blade may be obtained without the disadvantages hitherto attendant upon the use thereof as above explained.

In accordance with the present invention therefore, there is provided an improved form of device for protecting the tires of automobiles or other vehicles in which is employed a guard, clearing bar, deflector, extractor or the like having a blade with a bevelled leading or operative edge which is indented, i. e. made tooth-like or serrated and has the walls of the indentations in the said leading or operative edge chamfered or otherwise cut away so that the said indented leading or operative edge is thinned down or backed off throughout its effective length.

The invention will now be described with reference to the accompanying drawings in which:

Figs. 1 and 2 are respectively a side sectional elevation and a plan of one form of blade for tire protecting devices made in accordance with the invention;

Fig. 3 is a plan of another form, which is the same in side elevation as the form of Figs. 1 and 2;

Figs. 4 and 5 are side sectional elevations of blades for tire protecting devices made in accordance with the invention and provided with alternative means for assisting the blade to ride over the tire, more particularly when a foreign body partly embedded in the tire is engaged by the blade.

The blades illustrated in the drawing may be mounted so as to be either spaced from the tire, as shown, or maintained just in contact with it.

In the drawings I indicates the peripheral surface of the tire. The arrows indicate the direction of its movement.

Referring to Figs. 1, 2 and 3, reference character 2 indicates the blade proper of the tire protecting device and is arranged so as to be substantially parallel in the transverse sense to the adjacent part of the tire surface. 3 indicates a part integral with the blade 2 and extending upwards from it at an appropriate angle to make the blade suitable for mounting.

The indented leading edge of the blade, i. e. the edge against which foreign bodies adhering to or partly embedded in the tire will come first into contact, is bevelled and of a serrated or wavy form in plan and the walls of the indentations according to the present invention are chamfered as shown.

Figs. 1 and 2 illustrate a blade having V-shaped notches forming a sharply-toothed and bevelled leading edge 4. Fig. 3 is a plan view of a similar blade in which the leading edge 4 has wave formed indentations 7 and is bevelled.

In each case, in the constructional examples shown in the drawings, the V-shaped notches 6 or wave-form indentations 7 extend between and enter into the lower edge 8 and upper edge 9 of the bevelled surface of the blade, while the bases 6a of the notches or bottoms 7a of the indentations 7 are rearwardly inclined so as to lie substantially parallel with the bevel surface of the blade.

The walls of the notches 6 or indentations 7 are chamfered thus producing V-shaped notches or wave-form indentations in the bevel surface itself of the blade and thereby forming flared openings leading from the said indentations in the leading or operative edge of the blade and opening into the bevel surface thereof. Although, as shown, the indentations extend across the entire width of the bevel surface of the blade, they may if so desired, extend over only part of the width of such surface.

It will be appreciated by the constructions above described the leading or operative edge of a comparatively thick and strong blade is thinned down or backed off along the whole of the effective length so that while possessing the required inherent strength and rigidity the indented leading or operative edge will effectively engage the foreign bodies and readily permit the passage through the flared indentations of such bodies and extraneous dirt as may enter therein from beneath the blade.

A blade having such a leading edge is less liable to be pushed away from the tire by a foreign body than blades which have been previously proposed and is moreover less liable to dig into the tire. In order to enhance the last mentioned advantage a further precaution may be taken as illustrated in Figures 4 and 5.

In the arrangement of Figure 4, a projection or a continuous ridge, or a number of separate projections 5, is or are provided on the bottom of the blade 2. The part or parts 5, preferably just touch the surface of the tire, as shown.

In the arrangement of Figure 5, the underside of the blade is very slightly concave or hollow at 5', this hollow extending across it in the transverse direction.

The blade according to the present invention need not have the portion 3 nor be mounted on a device such as that described in the specification above referred to. It may be a blade corresponding to the portion 2 above which extends transversely across the tire and is supported at one or both ends so as to either be fixed or movable in a direction towards or away from the tire. It may be arched transversely so as to conform wholly or partly to the transverse curvature or other shape of the tire. The blade is preferably of metal and the chamfered indented leading edge may be formed by casting or machining or stamping or moulding.

I claim:

1. A clearing device for protecting tires of vehicle wheels comprising a blade member positioned to extend transversely of the outer periphery of a tire and having a proximate surface adapted to lie in close proximity to the outer peripheral surface of the tire, and a remote surface inclined at an acute angle to said proximate surface and forming therewith an operative transverse edge positioned to be first engaged by elements picked up by the tire, said edge having indentations therein, the walls of which are chamfered to form an acute angle with the proximate surface so that the operative edge is thinned down throughout its entire effective length.

2. A clearing device for protecting tires of vehicle wheels comprising a blade member positioned to extend transversely of the outer periphery of a tire and having a transverse operative edge positioned to be first engaged by elements picked up by the tire, a proximate surface adapted to lie in close proximity to the outer peripheral surface of the tire with the portion thereof adjacent said edge substantially tangential to the circumference of the tire, and a remote surface inclined at an acute angle to the tangential portion of said proximate surface to form said operative edge, said edge having indentations therein, the walls of which are chamfered to form an acute angle with the tangential portion of the proximate surface so that the operative edge is thinned down throughout its entire effective length.

3. A clearing device for protecting tires of vehicle wheels comprising a blade member positioned to extend transversely of the outer periphery of a tire and having a proximate surface adapted to lie in close proximity to the outer peripheral surface of the tire, and a remote surface inclined at an acute angle to said proximate surface and forming therewith an operative transverse edge positioned to be first engaged by elements picked up by the tire, said edge having indentations therein, the walls of which are chamfered to form an acute angle with the proximate surface so that the operative edge is thinned down throughout its entire effective length, and means on the proximate surface of said blade for limiting movement of the edge of the blade toward the tire.

4. A clearing device for protecting tires of vehicle wheels comprising a blade member positioned to extend transversely of the outer periphery of a tire and having a transverse operative edge portion positioned to be first engaged by elements picked up by the tire, a proximate surface adapted to lie in close proximity to the outer peripheral surface of the tire with the portion thereof adjacent said edge substantially tangential to the circumference of the tire, and a remote surface inclined at an acute angle to the tangential portion of said proximate surface to form said operative edge, said edge having indentations therein, the walls of which are chamfered to form an acute angle with the tangential portion of the proximate surface so that the operative edge is thinned down throughout its entire effective length, said proximate surface having a concave portion extending circumferentially of the tire from said indented edge.

WILLIAM CHARLES CARLTON.

REFERENCES CITED

The following references are of record in the file of this patent:

UNITED STATES PATENTS

| Number | Name | Date |
|---|---|---|
| 542,672 | Wright | July 16, 1895 |
| 841,958 | Frommater | Jan. 22, 1907 |
| 2,435,009 | Kief | Jan. 27, 1948 |

FOREIGN PATENTS

| Number | Country | Date |
|---|---|---|
| 16,595 | Great Britain | Aug. 24, 1911 |
| 645,723 | France | July 3, 1928 |